United States Patent [19]

Fortune

[11] 3,883,716
[45] May 13, 1975

[54] TEMPERATURE CONTROLLED SOLDERING INSTRUMENT

[76] Inventor: William S. Fortune, Panorama City, Calif.

[22] Filed: Mar. 8, 1971

[21] Appl. No.: 121,808

[52] U.S. Cl. ............... 219/241; 219/239; 219/242; 219/501; 219/517; 228/51; 248/176; 337/407
[51] Int. Cl. ..................... H01b 1/02; B23k 3/04
[58] Field of Search ............... 219/221, 229–231, 219/236–241, 501, 517; 228/51–55; 337/184, 185, 407

[56] References Cited
UNITED STATES PATENTS

| | | | |
|---|---|---|---|
| 915,974 | 3/1909 | Leonard | 219/241 X |
| 2,873,347 | 2/1959 | Boggs | 219/517 |
| 3,093,723 | 6/1963 | Adamson | 219/238 |
| 3,136,877 | 6/1964 | Heller | 219/501 UX |
| 3,304,396 | 2/1967 | Hasson | 337/407 X |
| 3,373,262 | 3/1968 | Howell | 219/241 UX |
| 3,393,856 | 7/1968 | Fortune | 219/241 UX |
| 3,551,639 | 12/1970 | Gotley | 219/241 |
| 3,560,710 | 2/1971 | Fuellemann | 219/501 X |
| 3,581,062 | 5/1971 | Aston | 219/501 |
| 3,622,746 | 11/1971 | Trouilhet | 219/241 |

FOREIGN PATENTS OR APPLICATIONS

| | | | |
|---|---|---|---|
| 588,216 | 5/1947 | United Kingdom | 219/241 |
| 930,351 | 8/1947 | France | 219/241 |
| 1,068,419 | 5/1967 | United Kingdom | 219/251 |

*Primary Examiner*—A. Bartis
*Attorney, Agent, or Firm*—Daniel T. Anderson

[57] ABSTRACT

A lightweight, compact soldering and desoldering instrument including a temperature sensor at the soldering tip. The sensor is of a type to provide a large change of resistance with a small change of temperature thereby to unbalance an electric bridge to create an error signal which in turn turns on or off the heating element of the soldering instrument. The entire electric control circuit is carried on a printed circuit board slidably disposed in the handle of the instrument and provides a closed loop temperature control. A closed tool holder is provided for maintaining the soldering instrument at its operating temperature when it is not in use thereby to extend the life of the soldering tip and to minimize the heating current. The control circuit is also provided with a special fuse which responds both to a thermal overload and an electrical overload to disconnect the current supply. The temperature of the soldering tip may be set by a control potentiometer in the handle of the instrument in accordance with different requirements.

6 Claims, 22 Drawing Figures

William S. Fortune
INVENTOR.

BY
Daniel T. Anderson
ATTORNEY

William S. Fortune
INVENTOR.

BY

Daniel T. Anderson
ATTORNEY

William S. Fortune
INVENTOR.

BY
Daniel T. Anderson
ATTORNEY

William S. Fortune
INVENTOR.

BY

Daniel T. Anderson
ATTORNEY

William S. Fortune
INVENTOR.

BY
Daniel T. Anderson
ATTORNEY

TEMPERATURE CONTROLLED SOLDERING INSTRUMENT

BACKGROUND OF INVENTION

1. Field of the Invention

The soldering iron may, for example, be used for soldering large terminals or for wiring of small printed circuit boards. For many purposes it is desirable to have available a soldering iron which is always ready for instant use, that is, a soldering iron which is always kept at the proper operating temperature. This, of course, requires a temperature control means of some type.

It has accordingly been suggested in the past to provide a soldering iron having a temperature sensing element located at or near the soldering tip of the iron. Various control circuits have been suggested in the past for this purpose including the use of magnetic amplifiers and the like. Alternatively, relays have been suggested for turning the power supply on and off.

However, in the past it has not been possible to provide both a simple electronic control circuit and an efficient temperature sensor which provides a large change of resistance with a small change of temperature so as to permit construction of a precision instrument.

Furthermore, it has not been possible in the past to combine an instrument of this type with a control circuit located entirely in the handle of the instrument thereby to provide a lightweight and compact soldering instrument.

It is accordingly an object of the present invention to provide a compact, efficient and lightweight soldering and desoldering instrument system with an electronic control circuit located in the handle of the instrument thereby to maintain the temperature of the soldering tip at the desired temperature for an extended period of time.

Another object of the present invention is to provide a special closed tool hodler for the soldering instrument thereby to prolong the life of the soldering tip and the lifetime of the heating element so that the instrument may be maintained at operating temperatures for prolonged periods of time without adversely affecting the life of the instrument.

A further object of the present invention is to provide a soldering instrument of the type disclosed which includes a closed loop temperature control and includes means for setting the temperature of the soldering tip from the outside of the handle of the instrument without the necessity to disconnect or disassemble the instrument.

Still another object of the present invention is to provide an electronically controlled soldering instrument with a special fuse which will disconnect the power supply either upon the occurrence of an electrical overload or whenever the temperature exceeds a predetermined value.

SUMMARY OF INVENTION

Briefly these and other objects are achieved in accordance with the structural aspects of an example of the invention in which the soldering and desoldering instrument system includes a temperature sensor located adjacent to the soldering tip of the instrument and capable of providing a relatively large change of resistance with a small change of temperature. By way of example the temperature sensor may consist of a thermistor providing a resistance change of 1.6% for each change of temperature of 1° Fahrenheit (F). The thermistor may form part of a resistance bridge, the unbalance of which may be sensed by a differential amplifier. The differential amplifier in turn provides an error signal which turns on or off the current supply to the heater element of the instrument. Preferably the resistance bridge and differential amplifier are arranged to operate on only one half cycle of the alternating input current so that the current carrying capacity of the components of the control circuit is minimized.

Further features of the invention may include the particular construction of the handle of the soldering instrument including an adjustment button cooperating with a potentiometer which permits setting of the temperature of the soldering tip. Additional features include the assembly of the handle of the instrument including a printed circuit board for the control circuit as well as a locking bushing for holding the soldering tip and the heater element sleeve providing a secure engagement between the handle and the heater element sleeve.

Still further features of the present invention may include a soldering instrument tool holder for thermally insulating the hot soldering instrument, for cleaning the soldering instrument when it is placed in the tool holder and additionally affording a precise temperature setting.

The novel feature that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF PREFERRED EMBODIMENT

SOLDERING INSTRUMENT

Referring now to the drawings, and particularly to FIGS. 1 through 9, there is shown by way of example a soldering and desoldering instrument embodying the present invention. In the following specification and claims the term "soldering instrument" is meant to include both a soldering as well as a desoldering device. As shown for example in FIG. 1, the soldering instrument includes a soldering tip 10, a heater element sleeve 11 and a handle or housing 12 for a circuit board 33 which supports the active and passive elements of the electronic control circuit of the instrument.

Figures 2, 3, 6, 10, 11:
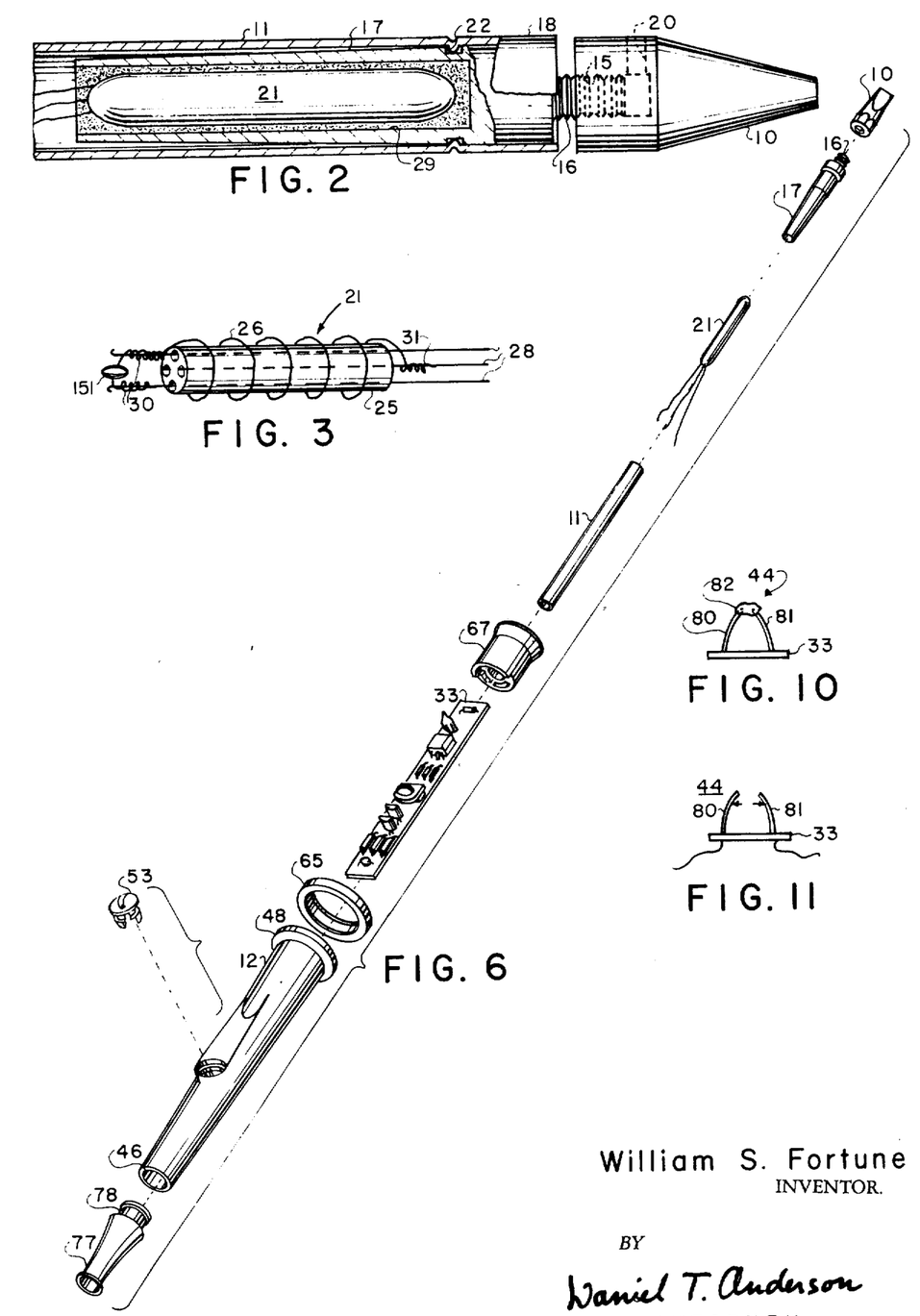
FIG. 2 is an elevational view, partly in section, and on enlarged scale taken on line 2—2 of FIG. 1 illustrating the construction of an example of the soldering tip and its heating element.
FIG. 3 is a perspective view of an example of the heating element for the soldering tip with the temperature sensor.
FIG. 6 is an exploded view of the soldering instrument of FIG. 1 illustrating its component parts.
FIG. 10 is a fragmentary side elevational view of the closed fuse of the control circuit responsive to either excess of current or temperature.
FIG. 11 is a fragmentary side elevational view similar to that of FIG. 10 and illustrating the fuse in the open position.

As shown particularly in FIG. 2, the soldering tip 10 may be provided with an internal thread 15 into which may be threaded a threaded bolt 16 forming part of the heater element cartridge 17. Thus the cartridge 17 may be provided with a head portion 18 from which protrudes the threaded bolt 16. The soldering tip 10 may also be provided with an aperture or bore 20 for inserting therein a temperature measuring instrument such as a thermocouple. Such a thermocouple may be pressed by the bolt 16 against the soldering tip 10 by screwing the tip 10 forcibly against the cylindrical portion 18 of the cartridge so that thermal contact is achieved between the measuring instrument and the soldering tip.

The heating element or heating cartridge sleeve 11 may consist of a suitable metal such for example as stainless steel. The heating element cartridge 17 may be rearwardly tapered as shown in FIG. 2. This design permits an air space of increasing size between the heating cartridge 21 and the outer sleeve 11. This in turn minimizes heat flow from the heating cartridge 21 to the handle 12. The heater element cartridge 17 may consist of a heat-conductive material such as copper. It should be noted that the heater element cartridge 17 is provided with an annular shoulder 22 into which the outer sleeve 11 may be swaged to provide a firm contact and a secure mounting.

Preferably the threads of the bolt 16 are coated with a suitable high temperature anti-seize compound. Such an anti-seize compound may be baked on the outer threads. Also the soldering tip 10 may be electroless nickel plated. It should also be noted that since the soldering tip 10 may be screwed on, or unscrewed, it is feasible to attach various soldering tips depending on the particular purpose. For example, the soldering tip may be provided with a chisel point, it may be formed like a spade or it may be provided with one or more longitudinal capillary slots for removing liquid solder from a joint that may have to be unsoldered.

The construction of the heating cartridge 21 is shown particularly in FIG. 3 to which reference is now made. It includes a ceramic core 25 about which is coiled a suitable resistance wire 26 which when supplied with current will produce a desired amount of heat. A temperature sensing element 151 is mounted at the far end of the resistance wire 26 and is disposed in close proximity to the soldering tip 10. Thus it is preferably disposed near or in the cylindrical portion 18 of the heater element sleeve 11.

It should be noted that 3 leads 28 feed the resistance wire 26 and the temperature sensing element 151 so that two wires form the current path for the resistance wire 26 while the remaining third wire carries the error signal from the temperature sensing element 151. The leads 28 may be coiled to provide spring like portions shown at 30 and 31 to permit expansion and contraction of the metallic elements upon heating and cooling of the heater cartridge. A high temperature ceramic adhesive 29 may secure the heating cartridge 21 to the heater element cartridge 17.

Figure 4:
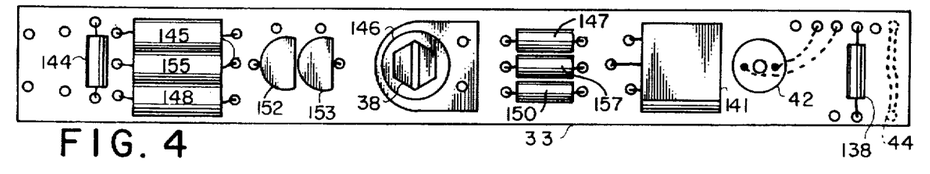
FIG. 4 is a top plan view, on enlarged scale, of an example of the printed circuit board, with its electric components, disposed in the handle of the instrument.
Figure 5:
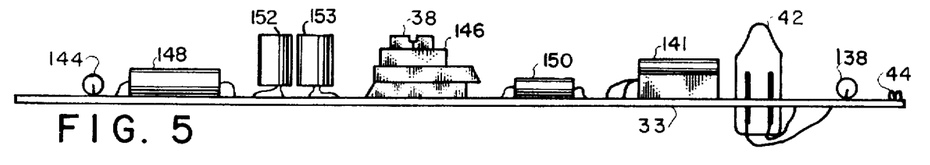
FIG. 5 is a side elevational view of the printed circuit board and components of FIG. 4.
Figure 21:
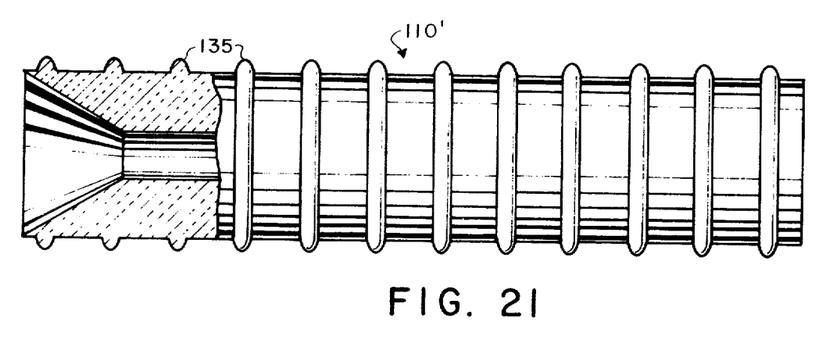
FIG. 21 is a fragmentary longitudinal sectional view of an example of a insulative, molded thermal "blanket" portion of the tool holder.

The electric control circuit is, in this example, mounted on the control board or printed circuit board 33 shown particularly in FIGS. 4 and 5 to which reference is now made. Mounted on the circuit board 33 is a diode 144 followed by a set of three resistors 145, 155, 148 and two transistors 152, 155. A potentiometer 146 is provided with an adjustment ridge 38 as shown. This is followed by another set of three resistors 147, 157, 150 and a silicon-controlled rectifier 141. A neon indicator lamp 42 may be provided to show that current is supplied through the heater element and this is followed by another resistor 138 and a fuse 44, the construction and operation of which will be discussed hereinafter in connection with FIGS. 10 and 11. The operation of the control circuit, the physical construction of which is shown in FIGS. 4 and 5, will be explained hereinafter in connection with FIG. 21.

Figure 7:
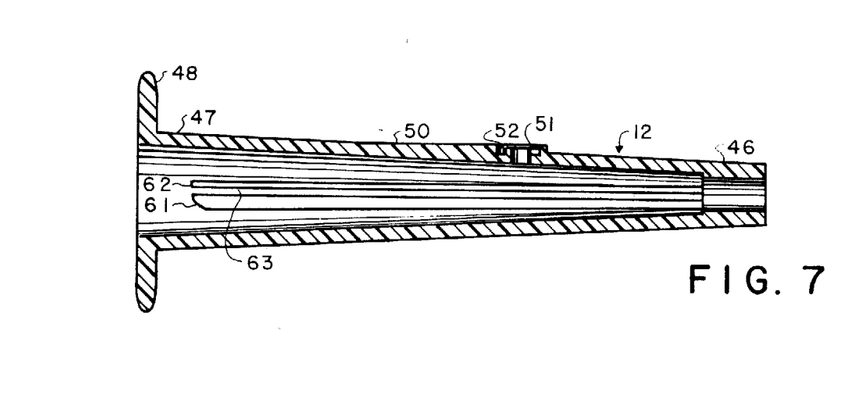
FIG. 7 is a longitudinal sectional view, taken on line 7—7 of FIG. 1 illustrating the housing or handle of the instrument.
Figure 8:
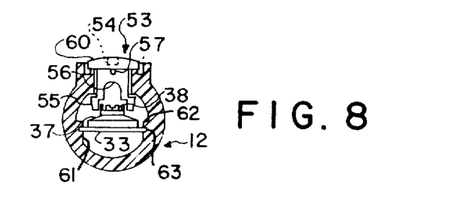
FIG. 8 is a cross-sectional view taken on line 8—8 of FIG. 1 illustrating the temperature setting button in cooperation with the potentiometer of the control circuit.

Reference is now made to FIGS. 6 and 7 illustrating particularly an example of the handle 12. As shown in FIG. 7, the handle 12 is of generally truncated conical or tapered shape having a reduced end portion 46 and a large end portion 47 with a generally disk shaped end 48. As shown particularly in FIGS. 1 and 7, the handle 12 has a somewhat flat top portion 50 provided with an aperture 51 having an enlarged annular outer portion 52. The opening 51 is designed to receive a control button generally designated at 53 in FIG. 6. As shown particularly in FIG. 1 and 8, the control button 53 is provided with an outer slot 54 by means of which it may be rotated, for example, by inserting a coin into the slot.

The control button 53 is designed to cooperate with the potentiometer 146 on the circuit board 33 and its control ridge 38. To this end the control button 53 may be provided with two downwardly extending ears 55 separated by a recess or relief 56. Thus the two ears 55 are capable of yielding to a radially inwardly directed pressure and may be inserted into the opening 51 in the handle 12 even though they have a larger diameter. The control button 53 is then locked into the handle 12 but is capable of rotation through a predetermined angle. Rotation of the control button 53 is limited by the provision of a stop tab 57 on the control button which cooperates with a segment-shaped projection 58 in the handle 12 as shown for example in FIG. 1. The control button 53 has a disc-like enlarged upper portion 60 which is received by the enlarged annular aperture 52 in the handle so that up and down movement of the control button 53 is limited in both directions by its upper disc 60 and by the enlarged ears 55.

The ears 55 now engage the control ridge 38 of the potentiometer 146. Accordingly it will be seen that rotation of the control button 53 by inserting a coin or the like into its upper slot 54 will cause rotation of the potentiometer. This in turn will cause a setting of the temperature of the soldering tip 10 to a particular desired value depending on the purpose to which the soldering instrument is to be put.

Referring again to FIGS. 7 and 8, it will be seen that the handle 12 is provided with two internal adjacent longitudinal projections 61 and 62 between which is formed a guidance slot 63 into which the circuit board 33 may be inserted. Due to the tapered construction of the handle 12 the circuit board which may be inserted from the left of FIG. 7 can only be pushed so far until its potentiometer 37 is disposed exactly in alignment with the opening 51 in the handle 12.

Figure 1:
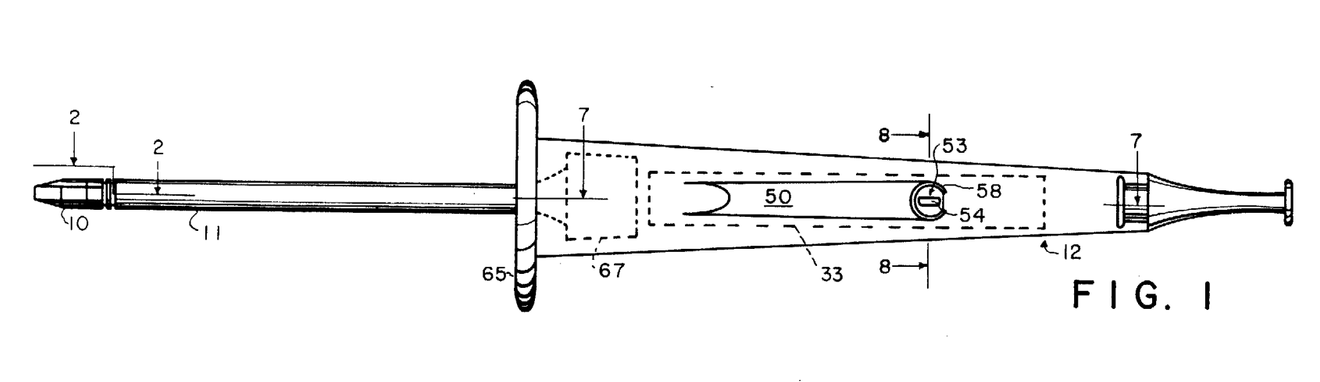
FIG. 1 is a plan view of an example of soldering and desoldering instrument of the invention.
Figure 9:
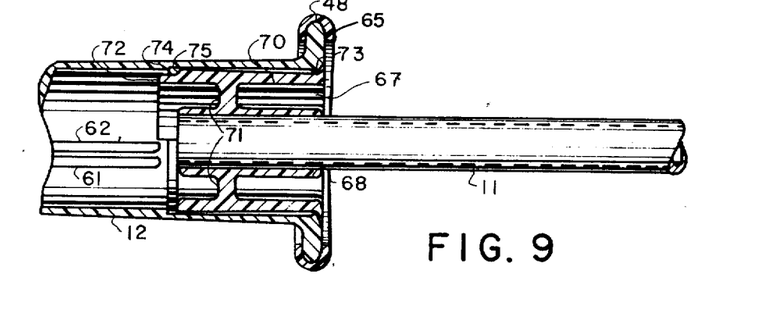
FIG. 9 is a cross-sectional view similar to that of FIG. 7 illustrating the handle housing with the locking bushing for the heating element in locked position as well as the guides for the printed board.

As shown particularly in FIGS. 1, 6, and 9, there may be provided a flexible or yieldable element 65 which is arranged to be forced over the disc like end 48 of the handle 12. This operates like a soft elastic bumper ring to prevent mechanical shock damage to the handle 12 and its electronic components.

Also shown in FIG. 6, there is provided a locking bushing 67 shown in more detail in FIG. 9 to which reference is now made. The locking bushing 67 is provided with an internal cylindrical recess 68 into which may be inserted the heating element sleeve 11. An outer cylindrical portion 70 of the locking bushing 67 may be connected to the inner cylindrical portion 68 by a radially extending web 71. The outer cylindrical portion 70 has a rearwardly extending portion 72 which extends essentially over an angle of 180° thereby to prevent rotation of the locking bushing by engagement with one of the circuit board guiding projections such as 62 from the inner surface of the handle 12. This, as clearly shown in FIG. 9, prevents further rotation of the locking bushing 67.

The bushing 67 is also locked in a longitudinal direction by the provision of an inwardly extending lip 73 formed at the outer end of the handle 12 adjacent the disc like portion 48. This will accordingly lock the locking bushing 67 and prevent it from moving toward the right in the drawing. Movement in the opposite direction is prevented by a bushing stop 74 provided in the inner surface of the handle 12 and engaging a matching shoulder 75 in the rearward portion 72 of the locking bushing 67.

As further shown in FIG. 6, there may be provided an element 77 of a suitable flexible or yieldable material through which the electric cord may extend which supplies power to the instrument. The element 77 may be of generally conical shape having an external recessed portion 78 for insertion into the small rear portion 46 of the handle 12.

Preferably the handle 12, the control button 53 and the locking bushing 67 are molded of some suitable plastic and insulating material. Preferably such a plastic insulating material is transparent for general appeal and inspection purposes and may, for example, consist of a polycarbonate sold in the trade by General Electric Company under the name Lexan. Furthermore, the protective ring 65 and the cord holder 77 may be also molded from a suitable insulating and plastic material. These parts need not be transparent.

Turning now to FIGS. 10 and 11, there is shown the fuse generally indicated at 44 in FIGS. 4 and 5. Thus as shown in FIG. 10, a pair of wires 80 and 81 extend through the circuit board 33. As shown in FIG. 10, they are interconnected by a lump 82 of a low melting point alloy. The fuse 44 is provided for the purpose to open so as to interrupt the line power to the active circuit elements either if the current flow is beyond a predetermined value or if the ambient heat exceeds a predetermined point. Thus the two wires 80 and 81, or if desired a plurality of such wires, are held together by the low melting temperature alloy 44.

By way of example, two wires having a diameter of 5 mils (0.005 inches) may be soldered together with an alloy metal which is designed to melt at a temperature of 158° F. Thus when the temperature exceeds 158° F the alloy will melt and the wire will spring open as shown in FIG. 11. Such a 5 mil diameter wire will handle a current flow on the order of 0.5 amperes without causing significant heating. However, if the current flow should be increased to approximately seven-eighths amperes the wire will immediately become hot thus melting again the low temperature soldering alloy. The wires 80, 81 preferably consist of a suitable spring wire consisting, for example, of a nickel-chrome or a beryllium-copper alloy.

By increasing, for example, the size of the spring wire from 5 mils to say 12 mils, the normal current consumption could be increased to say 1.5 amperes. If it should be desired to have the fuse melt at a higher temperature such as 190° F, it is feasible to use a soldering alloy which melts at such a temperature. Thus by properly selecting the size of the wire and the melting temperature of the alloy or solder, a fuse may be arranged to give protection at any desired current or any desired temperature.

It will be appreciated that the use of the fuse 44 greatly increases the safety of the resulting instrument in that the instrument will be automatically disconnected from the current supply either if the input current increases beyond a desired value or if the temperature increases due to any malfunction of any element.

Having now described the construction and general operation of the soldering instrument of the invention, the construction of a tool holder for such a soldering instrument will now be discussed. Subsequently, the electronic temperature control circuit which controls the instrument will be described.

TOOL HOLDER FOR SOLDERING INSTRUMENT

Various embodiments of a tool holder in accordance with the present invention for the previously described soldering instrument will now be discussed. These are illustrated in FIGS. 12 through 21 to which reference is now made.

Figure 12:
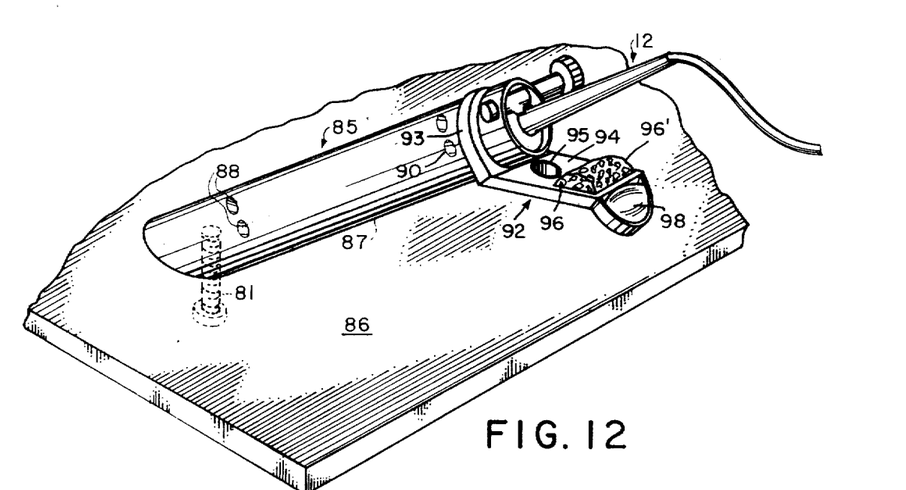
FIG. 12 is a view in perspective of one embodiment of the soldering instrument tool holder with a soldering instrument inserted therein and with a soldering tip wiper, a lens and solder flux pot.

Referring now particularly to FIG. 12, there is shown a tool holder generally indicated at 85 which may be secured, for example, to work table 86 for holding the soldering instrument of the invention. Thus there is shown protruding from the tool holder 85 the handle 12 of a soldering instrument. The tool holder 85 itself consists of a generally cylindrical hollow housing 87 into which the soldering instrument may be inserted.

The housing 87 may consist of a heat resistant material such as a suitable plastic material which may be molded. It may be provided with a set of cold air inlet openings 88 near the bottom of the instrument and another set of hot air outlet openings 90 disposed near the entrance of the holder. Alternatively the air openings may be longitudinal slots adjacent a set of outwardly extending ridges 89 which serve the purpose to afford a relatively cool gripping surface. The holder 85 may be secured to the work bench or table 86 by a suitable threaded bolt 91 which in turn may be secured to the housing 87 in a manner to be further explained in connection with FIG. 15.

The tool holder 85 may be provided with an attachment 92 including a ring-shaped holder 93 which is adapted to surround the housing 87. Preferably, the housing 87 has a slightly conical portion near its entrance to afford a press fit to the ring 93. The attachment then continues in a generally horizontal tray 94 including a pocket-like depression or opening 95 adapted to contain a flux. Another pocket 96 may be provided for holding a sponge 96' which may consist of a suitable heat resistant plastic. The sponge may serve the purpose to clean the soldering tip after use. The tray 94 may finally be provided with a magnifying lens 98 which may be molded together with the remainder of the attachment 92. The lens may serve the purpose of inspecting the finished work or facilitating soldering of small parts.

Figure 13:
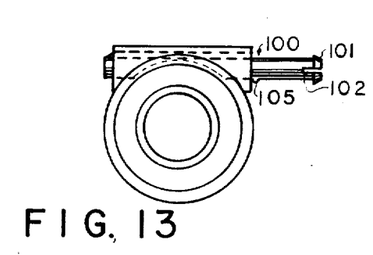
FIG. 13 is an end elevational view of the soldering instrument tool holder of FIG. 12 and its locking pin in the open position.
Figure 14:
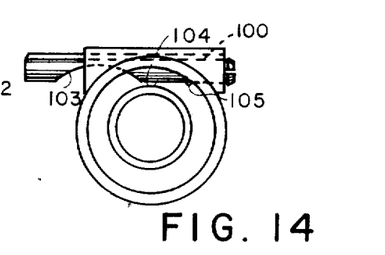
FIG. 14 is an end elevational view similar to that of FIG. 13, with the locking pin shown in the locked position.

Preferably, the holder 85 is provided with a suitable locking mechanism for the soldering instrument and shown particularly in FIGS. 13 and 14. This may, for example, consist of a locking pin 100 having an actuating button 101 at one end thereof which may be mounted therein by a suitable pin 102. The locking pin 100 is provided with a curved recess 103 which permits the soldering tool to enter the holder when in the position of FIG. 13. Subsequently, it may be moved into the position of FIG. 14 whereby the flat or straight portion 104 of the locking pin 100 locks the soldering instrument in the holder. Thus the locking pin may engage the bumper ring 65 on the soldering instrument as shown in FIG. 1.

The locking pin 100 may be provided with a semispherical projection or button 105 extending on the under surface of the pin 100. It serves the purpose of locking the pin in either the position of FIG. 13 of that of FIG. 14. As shown in FIG. 13, it prevents accidental closing or locking because it has to be forced into a narrow circular opening within the tool holder housing 87. Similarly when it has been pushed into the locked position the projection 105 prevents accidental opening of the locking pin.

By locking the soldering instrument by moving the locking pin into the position of FIG. 14, accidental removal of the soldering instrument from the holder, for example by accidentally pulling on the cord, is prevented.

Figure 15:
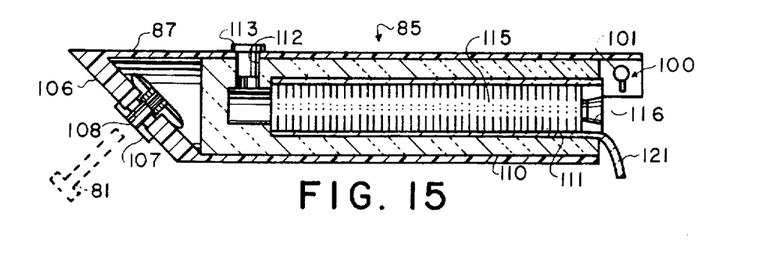
FIG. 15 is a sectional view of the soldering instrument tool holder of FIG. 12 including an internal brush liner for wiping off or cleaning solder and other particles from the soldering instrument.
Figure 16:
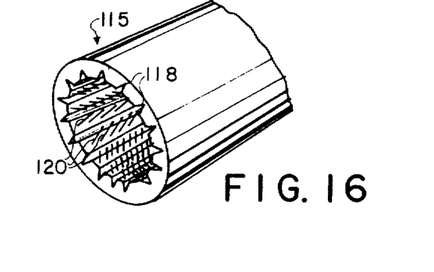
FIG. 16 is a view in perspective of a portion of the brush liner disposed in the tool holder of FIG. 15.

Another embodiment of the tool holder of the invention is illustrated in FIGS. 15 and 16 to which reference is now made. Here the tool holder 85 may be the same as that previously shown and may include the locking pin 100 with its operating knob 101. The rear portion 106 of the housing 87 may form an acute angle as shown. It may be provided with a mounting bushing 107 having an internal thread 108 for engagement with the mounting bolt 81 which permits to secure the holder to a suitable surface.

The tool housing 87 may be provided with a heat insulating cylindrical insert 110. This may, for example, consist of a heat insulating rigid foam. It will be understood that the air openings 88, 90 (see FIG. 12) only extend through the housing 87. The insert 110 forms an internal cylindrical chamber 111 and may be provided with a radial opening 112 which communicates with the exterior. This opening may be closed with a suitable hole plug 113 when not in use. However, it may be used for inserting therein the sensor of a temperature measuring device so that the soldering instrument may be calibrated in a manner to be presently explained in connection with FIG. 17.

The cylindrical opening 111 of the heat insulating liner 110 may be filled with a brush liner 115. This brush liner may serve the purpose to clean the soldering tip of the instrument from accumulated solder or other particles. For the same purpose, a bushing 116 may be provided at the entrance of the opening 111 partly to clean the soldering tip and partly to heat insulate it from the outside air.

The brush liner 115 may be made from a flat structure of a suitable heat insulating material having depressions or corrugations therein. This is shown particularly in FIG. 16 which illustrates the formed brush liner 115 having corrugations 118 therein and individual brushes or filaments 120 extending from the flat portions between the depressions 118. The brush liner 115 may be provided with a pull tab 121 so that it may be removed and cleaned or replaced as necessary.

Figure 17:
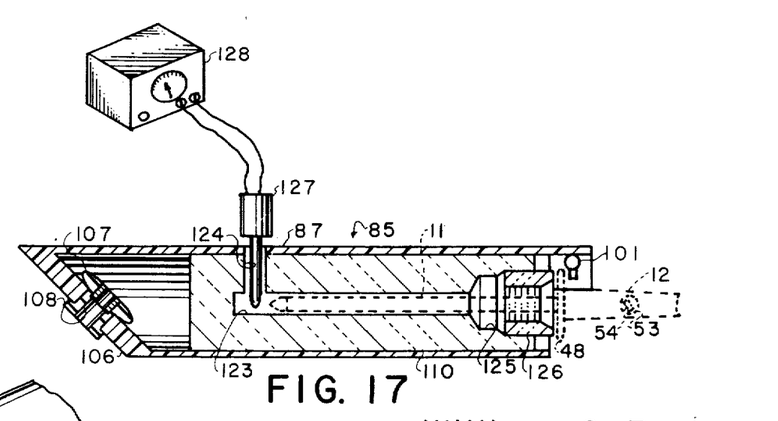
FIG. 17 is a sectional view of another embodiment of the soldering instrument tool holder including a meter for measuring the temperature of the tip of the soldering instrument.

The instrument holder of FIG. 17 may be generally the same of that of FIG. 15. However, it is specifically designed for calibrating the temperature of the soldering instrument. The housing 87 of the tool holder may be of the same shape as that of FIG. 15 and may be provided again with a heat resistant liner 110 which may consist of a rigid foam. This may provide an internal cylindrical opening 123 for inserting therein the soldering tip and heater element sleeve 11. The liner 110 may also be provided with another radially extending opening 124 communicating with the outside and extending through the housing 87. An enlarged opening 125 may communicate with the opening 123 and may form a particle trap, that is, a trap for the particles which may adhere to the soldering tip. A removable brush liner 126 may be disposed adjacent to the opening 125 and near the entrance of the instrument. The brush liner 126 may be made removable so that it may be cleaned or replaced as the need arises.

A temperature sensing probe 127 may be inserted into the radial opening 124 and may be connected to a temperature indicator 128.

Accordingly, a soldering instrument may be inserted into the tool holder 85 as shown in FIG. 17. The slot 54 of the control knob 53 which extends outside of the tool holder may now be turned until the temperature indicator 128 indicates the desired temperature of the soldering tip. Thus the tool holder 85 may be used for calibrating or setting a number of soldering instruments to any desired temperature depending on the purpose for which each instrument is to be used. It will be noted that this temperature setting may be effected without moving the soldering iron because the control knob 53 extends from the tool holder 85 and may be set without removing the instrument. When the setting or calibration of the instruments is finished the temperature probe 127 may be removed from the radial opening 124 which may then be closed with a suitable plug such as the plug 113 of FIG. 15.

By retaining the soldering instrument in the tool holder, heat loss, or current consumption, is minimized as well as oxidation of the soldering tip because there is little or no air flow around the soldering tip. This in turn will extend the life of the soldering tip and of the heating element as well as minimizing current consumption.

Figure 18:
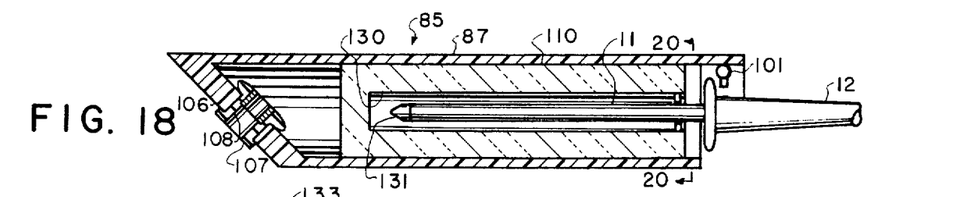
FIG. 18 is a sectional view of still another embodiment of the soldering instrument tool holder of the invention and particularly designed for a soldering instrument having a soldering tip with rectangular cross-section.
Figure 19:
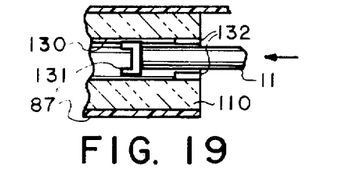
FIG. 19 is a fragmentary sectional view, similar to that of FIG. 18, showing a pair of swinging doors provided at the entrance of the tool holder in the open position while the soldering tip is being inserted.
Figure 20:
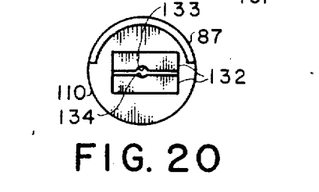
FIG. 20 is an end elevational view taken on line 20—20 of FIG. 18 illustrating the swinging doors at the entrance of the tool holder in the closed position.

Still another embodiment of the tool holder of the invention is illustrated in FIGS. 18 through 20 to which reference is now made.

Again, the housing 87 of the tool holder 85 may have the same shape as shown in FIG. 15. A heat resistant liner 110 which may consist of a rigid foam forms an internal chamber or opening 130. The liner 110 may be closed at its far end as shown. The main purpose of the tool holder 85 of FIG. 18 is to accommodate a soldering tip 131 of generally rectangular or U-shape. Such soldering tips may be particularly useful for desoldering soldered joints.

To this end the entrance to the liner 110 may be provided with a pair of swinging doors 132 which may be spring biased or flexible to permit the entrance of the soldering tip 131 as shown in FIG. 19. After the instrument has been moved into the opening 130, the swinging doors 132 are shut again as shown in FIG. 20. Each of the swinging doors 132 may be provided with a central semi-circular recess 133 and 134 for permitting the outer sleeve 11 of the heating element of the soldering iron to pass through. Accordingly, after the swinging doors 132 have been closed, the instrument is substantially heat insulated within the heat resistant liner 110.

Among the advantages of the tool holder 85 of the invention is the fact that it prolongs the life of the soldering instrument while reducing the current consumption. Furthermore, it permits maintaining the soldering instrument at all times at its proper operating temperature so that it is always ready for use. Accidental removal of the soldering instrument by accidentally pulling, for example, on its cord, is substantially prevented by the locking mechanism. Further, the holder of the invention makes it possible to place the soldering instrument in its holder in a tool box or the like without damaging the tool box due to the heat of the instrument. Also, the raised ridges 89 on the outside of the housing 87 permit confortable gripping or other touching of the tool holder even though the tool holder may be relatively hot. Similarly, heat flow from the insulating liner 110 into the housing 87 may be lessened by a set of axial longitudinal ridges, now shown, which extend radially inwardly to grip the liner 110. In addition, as shown in FIG. 22, the insulating liner 110' may be molded to form a set of outwardly extending circumferential ridges 135 which contact the inwardly extending longitudinal ridges at a set of points only, thereby further minimizing the heat conductance between the "blanket" liner 110 and the housing 87.

ELECTRONIC TEMPERATURE CONTROL CIRCUIT

Figure 22:
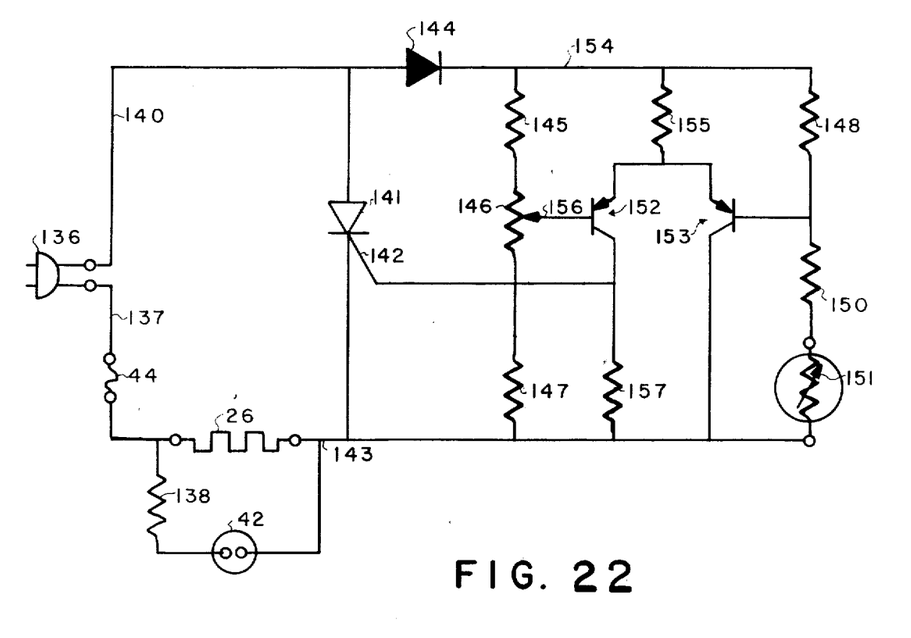
FIG. 22 is a circuit diagram of the electronic control circuit and sensing element including the heater element of the soldering instrument of the present invention.

The electronic control circuit is illustrated in FIG. 22. It will be recalled that FIGS. 4 and 5 show the circuit board 33 with the components thereon. The control circuit of FIG. 22 may be supplied with power by a plug 136 which may supply alternating current to the circuit. The voltage may be either 115 volts or 230 volts. No change or adjustment of the circuit is required when changing the voltage. The lead 137 supplies power to the fuse 44 which has previously been described in connection with FIGS. 10 and 11. Following the fuse 44 there is the resistance wire 26 which forms the heater element as previously expalined. A bypass around the resistance wire 26 is formed by a resistor 138 and the lamp 42 which will light up whenever there is a voltage across the resistance wire 26.

The lead 140 connects to the other terminal of the plug 36 and then to a silicon controlled rectifier 141 having a control or gate element 142. The silicon controlled rectifier 141 is connected between the lead 140 and the junction point 143 of the resistance wire 26 and the lamp 42. A diode 144 is also connected to the lead 140 and may be a semiconductor diode. Both the diode 144 and the control rectifier 141 are so poled as to pass only the positive cycles of the alternating input current.

Connected across the silicon controlled rectifier 141 and the diode 144 are two branches of a resistance bridge. The bridge has one branch which consists of resistor 145, potentiometer 146 and resistor 147. The other branch of the resistance bridge includes a resistor 148, resistor 150 and resistor 151 which represents the thermistor 27, that is, the temperature sensing element. The resistor 151 has been shown variable to indicate that its resistance varies as a function of temperature.

The circuit is concluded by a pair of transistors 152 and 153 which may be PNP transistors as shown. Thus the two emitters of transistors 152 and 153 are connected together. A resistor 155 is connected between the junction point of the two emitters and a lead 154 connected between diode 144 and resistors 145 and 148. The base of transistor 153 is connected to the junction point between resistors 148 and 150 while its collector is connected to the junction point 143. The base of transistor 152 is connected to the variable slider 156 of the potentiometer 146. Its collector is tied directly to the control element 142 of the silicon controlled rectifier 141 and also is connected to the junction point 143 through a resistor 157.

Essentially the control circuit of FIG. 22 consists of a resistance bridge. The bridge has four arms, the first being formed by resistor 145 and the portion of resistor 146 above the slider arm 156. The second branch is formed by the lower portion of resistor 146 below the slider 156 and resistor 147. The other two branches are formed by resistor 148 and finally by resistors 150 and 151.

Normally the resistance bridge is balanced but becomes unbalanced due to a change of temperature which varies the resistance of resistor 151. This will now create an error signal which is amplified by the differential amplifier including the two transistors 152 and 153. This error signal in turn will be amplified and will apply such a voltage to the control element 142 as to either turn the silicon controlled rectifier on or off. If the rectifier is on, it will permit the current to pass through the resistance wire 26, but otherwise not.

Since the temperature sensing element 151 is disposed close to the heating wire 26, the system becomes a closed loop temperature regulating circuit. It is capable of maintaining the temperature of the soldering tip within very close margins. This is due to the fact that the thermistor 151 may be made to be extremely sensitive. For example, the thermistor 151 may have a change of resistance of 1.6% for each change of temperature of 1° F. Thus if the thermistor 151 has a resistance of 1,000 ohms it will change its resistance by 16 ohms per degree Fahrenheit etc.

Assuming, for example, that the temperature of the soldering tip decreases due to excessive radiation of heat or the like, this will cause an increase of the resistance of the thermistor 151. This, of course, will unbalance the bridge. On the other hand, if the temperature of the soldering tip increases beyond the set value, the resistance of the thermistor decreases below the balance point of the bridge. This will cause the differential amplifier to generate an error signal which in turn will turn off the heater power.

Thus assuming that the soldering tip temperature decreases and that the resistance of thermistor 151 increases; as a result the voltage of the base of transistor 153 becomes more positive with respect to the voltage of the base of transistor 152. Consequently, current flows through the base of transistor 152 and this current is amplified by the beta of the transistor 152. This amplified current now flows through resistor 155 into the emitter of transistor 152 and thence into the collector circuit and back through resistor 157. The current also flows to the gate 142 of silicon controlled rectifier 141. This current flowing through the gate 142 turns on the silicon controlled rectifier 141. Accordingly, current is permitted to flow through the silicon controlled rectifier 142 and to heater element 26. This, of course, will tend to raise the temperature of the soldering tip with a resulting decrease of the resistance of resistor 151.

Assuming now that the resistance of thermistor 151 falls below the balance point due to an increase in temperature. In this case, the voltage applied to the base of transistor 153 becomes more nagative than the voltage at the base of transistor 152. In this case, current flows through the base of transistor 153 which is again amplified by the beta of transistor 153. The amplified current flows through the resistor 155 into the emitter of transistor 153 and thence through the collector of the transistor. In this case, the base current of transistor 152 does not flow because the two emitters of the two transistors are coupled together. As a result there is no current flowing to the gate 142 and the silicon controlled rectifier 141 is turned off. This will take place during the positive half cycle of the alternating current as soon as anode current stops flowing.

The resistor 157 provides a load for the collector of transistor 152. It also supplies a path for the leakage current of the gate 142. This will prevent misfiring of the silicon controlled rectifier 141.

It should be noted that the diode 144 supplies direct current to the differential amplifier 152, 153 but only during the positive half cycles. As a result, the power dissipation of the various components is only 50% of that when all of the alternating power is applied to the circuit. Accordingly, the silicon controlled rectifier is always turned off during each negative cycle of the input current. Once the rectifier 141 fires, it continues to conduct by self regeneration for the entire positive half cycle. However, it is always turned off when the alternating line voltage becomes negative. Everytime the silicon controlled rectifier fires, the differential amplifier, as well as the bridge supply voltage, are shunted by the rectifier 141. However, this is of no consequence for the operation of the circuit because the rectifier, once fired, continues to conduct during the entire positive half cycle.

As mentioned before, the resistor 138 and neon lamp 42 form the indicator circuit to indicate that power is being supplied to the instrument. It will be understood that the lamp 42 only glows as long as there is a voltage across the resistance wire 26. Hence when the silicon controlled rectifier 141 is turned off, there is no voltage across the heater wire 26 and hence the lamp 42 is off.

The potentiometer 146 with its slider 156 determines the temperature setting of the instrument. This will be apparent because the position of the slider 156 determines the balance point of the bridge. Thus if the slider 156 is moved upwards, the voltage applied to the base of transistor 152 becomes more positive and vice versa.

It will be understood that the circuit specifications of the electronic temperature control circuit of FIG. 22 may vary according to the design for any particular application. The following circuit specifications are included, by way of example only, as suitable for a soldering instrument using a thermistor with the properties previously expalined and for a line voltage range which is broad enough to include 115 or 230 volts of alternating current without the need to switch or otherwise adjust for different line voltages:

| | |
|---|---|
| Resistor 145 | 100,000 ohms |
| Resistor 155 | 100,000 ohms |
| Resistor 148 | 100,000 ohms |
| Resistor 147 | 1,500 ohms |
| Resistor 157 | 1,500 ohms |
| Resistor 150 | 1,000 ohms |
| Resistor 138 | 30,000 ohms |
| Potentiometer 146 | 10,000 ohms |
| Diode 144 | General Electric Type IN5060/A14D |
| Transistors 152 & 153 | Motorola type 2N 5086 |
| Silicon Controlled Rectifier 141 | GE Type C106C2X100 |
| Neon lamp 42 | GE Type AIC |
| Thermistor 151 | Fenwal type GA71C1 10,000,000 ohms |
| Fuse 44 | Beryllium-copper wire 0.005" diameter |

It is to be emphasized that the same instrument without manual adjustment in any manner may be interchangeably connected to any typical line voltage, the circuit automatically making all adjustments to provide the same desired tip conditions. It may, however, be noted that when a line voltage of 115 volts is utilized, the instrument readily delivers power at the rate of approximately 50 watts; while the same instrument connected to a 230 volt supply delivers up to 200 watts upon instantaneous thermal demand.

There has thus been disclosed a soldering instrument having a resistive temperature sensor near its tip and an electronic control circuit disposed in the handle of the instrument. The control circuit includes a resistance bridge, one arm of which is formed by the temperature sensing element which may be a thermistor. A differential amplifier generates an amplifier error signal in response to unbalance of the bridge. This in turn will either cause power to flow through the heater wire or cause the power to be turned off. The instrument includes a control button by means of which the setting of the temperature may be controlled from the outside. There is further provided a tool holder for the soldering instrument which insulates the instrument and may include a brush liner for cleaning off the soldering tip. The holder will maintain the instrument at its set temperature with a minimum of power. This, of course, will prolong the life of the soldering tip and the heating element because a minimum of power is required and oxidation of the tip is minimized. It is also feasible to calibrate each soldering instrument by inserting it into a tool holder and inserting also therein a temperature measuring instrument. The soldering instrument with its electronic control circuit is compact and lightweight and will withstand rough handling. It is always ready for use because its soldering tip is automatically maintained at the proper temperature.

I claim:
1. A soldering instrument having an electronic temperature control comprising:
   a. a soldering tip;
   b. a hollow sleeve connected to said soldering tip;
   c. a heater element disposed in said sleeve for heating said tip;
   d. a temperature sensor disposed in said sleeve and in close proximity to said tip;
   e. a hollow one piece handle having a tapered bore;
   f. means for securing said sleeve to said handle;
   g. two opposed, longitudinally extending grooves formed in the internal walls of said tapered bore of said handle such that said grooves converge toward each other from one end of said handle to the other;
   h. a circuit board disposed in said grooves of said handle and positioned thereby, said circuit board mounting an electronic control circuit;
   i. said electronic control circuit including a potentiometer for setting the desired temperature of said tip;
   j. said circuit board having a width sized such that when inserted into said handle through the end thereof having the wider groove separation, said circuit board can only be pushed toward the other end to a position such that said potentiometer carried thereby is disposed in alignment with said aperture in said handle; and
   k. a rotatable control button disposed in said aperture and having an element thereon disposed for rotation of said potentiometer, whereby rotation of said control button will vary said potentiometer to set the desired temperature.

2. A soldering instrument as defined in claim 30 wherein said potentiometer is provided with a rotatable control ridge extending therefrom, and wherein said element of said control button includes a pair of depending, opposed locking ears adapted to engage said ridge for rotation thereof, said ears being capable of being forced through said aperture of said handle into engagement with said ridge, said ears cooperating with said handle to lock said control button against movement in the direction of the axis thereof, while permitting rotation thereof.

3. A soldering instrument as defined in claim 1 wherein a fuse is included in said electronic control circuit, said fuse consisting of two spring wires stressed against each other and interconnected by a conductive alloy having a predetermined melting point, said wires having a predetermined electric current carrying capacity, whereby an electric current in excess of a predetermined current melts said alloy to cause said wires to spring apart, and whereby an ambient temperature in excess of the melting temperature of said alloy melts said alloy to cause said wires to spring apart, thereby to provide protection from an overload of electric current or an excess of temperature.

4. A soldering instrument having an electronic temperature control comprising:
   a. soldering tip;
   b. a hollow sleeve connected to said soldering tip;
   c. a heater element disposed in said sleeve for heating said tip;
   d. a temperature sensor disposed in said sleeve and in close proximity to said tip;
   e. a hollow handle;
   f. a locking bushing positioned on said sleeve and disposed substantially in said handle for securing said sleeve to said handle, said handle having a stop for limiting axial movement of said locking bushing into said handle, and said handle having means for yieldably retaining said bushing;
   g. two opposed, longitudinally extending grooves having adjacent projections in said hollow handle;
   h. a circuit board disposed in said grooves of said handle and slidable between said grooves for guiding and positioning said circuit board, said circuit board mounting an electronic control circuit;
   i. said electronic control circuit including a potentiometer for setting the desired temperature of said tip;
   j. said handle having an aperture in register with said potentiometer when said circuit board is positioned therein; and
   k. a rotatable control button disposed in said aperture and having an element depending therefrom for rotation of said potentiometer, said locking bushing having a portion adapted to abut one of said projections for limiting rotation of said locking bushing in said handle.

5. A soldering instrument as defined in claim 33 wherein said means for yieldably retaining said locking bushing consists of an outer, inwardly projecting lip on said handle.

6. A soldering instrument as defined in claim 4 wherein said locking bushing has a central opening for receiving said sleeve, said central opening having a size to provide a press fit with said sleeve, and said bushing having an outer surface mating the inner surfae of said handle.

* * * * *